United States Patent
Hashimoto et al.

(10) Patent No.: US 6,343,052 B1
(45) Date of Patent: Jan. 29, 2002

(54) MAGNETO-OPTICAL MEDIUM HAVING FILM WITH ROUNDED UPPER CORNER AND THICKNESS DECREASING TO THE SIDE END ON LANDS

(75) Inventors: Morimi Hashimoto, Saitama; Yasuyuki Miyaoka, Kanagawa, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,193

(22) Filed: Apr. 7, 2000

(30) Foreign Application Priority Data

Apr. 15, 1999 (JP) .......................................... 11-108012

(51) Int. Cl.⁷ ............................................. G11B 11/00
(52) U.S. Cl. ....................................................... 369/13
(58) Field of Search ........................ 369/13, 14, 110.01, 369/112.01, 116, 275.4, 275.2; 428/64.3, 694 ML

(56) References Cited

U.S. PATENT DOCUMENTS

| | | | | |
|---|---|---|---|---|
| 4,931,336 A | * | 6/1990 | Haneda | 428/64.4 |
| 5,274,623 A | * | 12/1993 | Usami et al. | 369/275.4 |
| 5,325,353 A | * | 6/1994 | Sasaki et al. | 369/275.2 |
| 5,430,706 A | * | 7/1995 | Utsunomiya et al. | 369/275.1 |
| 5,798,987 A | * | 8/1998 | Ogawa | 369/13 |
| 5,962,154 A | | 10/1999 | Hashimoto et al. | 428/694 ML |
| 6,027,825 A | | 2/2000 | Shiratori et al. | 428/694 ML |

FOREIGN PATENT DOCUMENTS

| | | |
|---|---|---|
| JP | 290493 | 10/1994 |
| JP | 290496 | 10/1994 |
| JP | 275369 | 10/1998 |
| JP | 126381 | 5/1999 |
| JP | 328762 | 11/1999 |

* cited by examiner

Primary Examiner—Tan Dinh
(74) Attorney, Agent, or Firm—Fitzpatrick, Cella, Harper & Scinto

(57) ABSTRACT

The present invention provides a domain wall displacement-type magnetooptical recording medium effective for decreasing jitter, in which a conventional herringbone recording mark can be changed to a linear mark.

The magnetooptical recording medium of the present invention includes a substrate having lands and grooves, and a magnetic layer deposited on the substrate so as to be magnetically interrupted between the lands and the grooves, wherein the magnetic film deposited on each of the lands has a section having a flat bottom, and a substantially flat top in the central portion of each of the lands, either side having a thickness decreasing in the direction to the side end.

3 Claims, 4 Drawing Sheets

MAGNETO-OPTICAL MEDIUM HAVING FILM WITH ROUNDED UPPER CORNER AND THICKNESS DECREASING TO THE SIDE END ON LANDS

BACKGROUND OF THE INVENTION

1. Field of the Invention

The present invention relates to a magnetooptical recording medium from which very high-density information can be reproduced by utilizing domain wall displacement during reproduction.

2. Description of the Related Art

Although a magnetooptical disk has recently attracted attention as a reloadable high-density recording medium, it is desired to further increase the recording density of a magnetooptical disk to obtain a large-capacity recording medium. The linear recording density of the magnetooptical disk greatly depends upon the laser wavelength $\lambda$ of a reproduction optical system and the numerical aperture NA of an objective lens, and the spatial frequency in signal reproduction has a detectable limit of about $NA/\lambda$.

Therefore, in order to realize a high density by a conventional optical disk, it is necessary to shorten the laser wavelength of the reproduction optical system, and increase the numerical aperture NA of the objective lens. However, improvements in the laser wavelength k and the numerical aperture NA of the objective lens are also limited. Therefore, some techniques have been proposed, in which a recording density is improved by a specific construction of a recording medium, and a reading method.

For example, the applicants proposed in Japanese Patent Laid-Open No. 6-290496 a magnetooptical recording medium in which signals having a period smaller than the light diffraction limit can be reproduced at a high speed without decreasing the reproduction signal amplitude, and a reproduction system and reproducing device therefor. Namely, a temperature distribution is formed in a reproducing layer of the magnetooptical recording medium by heating means such as a light beam or the like to produce a distribution in the domain wall energy density, thereby permitting a domain wall to be instantaneously moved or displaced to the lower domain wall energy side.

As a result, the reproduction signal has a constant maximum amplitude without depending upon the interval of the recorded domain walls (i.e., the recording mark length). In this way, the inevitable decrease in reproduction output accompanying an improvement in the linear recording density is significantly minimized enabling a further increase in density.

The domain wall displacement-type magnetooptical recording medium disclosed by the applicants in the Japanese Patent Laid-Open No. 6-290496 comprises the same recording system (the method of recording on a memory layer) as a conventional magnetooptical recording system.

FIG. 1 schematically shows the result of observation of recording pits (recording magnetic domains 11) from the upper side of a magnetooptical recording medium (disk).

Grooves and lands are formed circumferentially on the magnetooptical recording medium (disk) so that they are arranged alternately in the radius direction of the medium.

In FIG. 1, the recording magnetic domains 11 are formed on each of recording tracks 14. For a reproduction spot 13, a Ts isothermal line 12 is extended elliptically in the movement direction of the medium on the medium. When the leading end of the Ts isothermal line 12 approaches the recording domains 11, domain wall displacement occurs.

In general, as shown in FIG. 1, each of the recording magnetic domains 11 has a circular-arc shape (herringbone shape). This is due to the phenomenon that the Ts isothermal line 12 has a circular shape close to an ellipse during recording, and thus the shape of a recording mark is determined by the circular arc of the isothermal line in a recording track. Here, Ts represents a temperature close to the Curie temperature of a second magnetic layer, as well as a temperature where bonding between first and third magnetic layers is cut, and the domain wall of the first magnetic layer moves to the lower side of the domain wall energy.

In reproduction, domain wall displacement occurs when the Ts isothermal line approaches a recording mark to obtain a reproduction signal in a state where the recording mark is enlarged.

In reproducing a herringbone-shaped recording mark, the recording mark which enters a reproduction spot gradually approaches from the central portion of the herringbone mark in a track, and thus the starting time (timing) of domain wall motion possibly changes with the mark size and the relative speed. Furthermore, the direction of a herringbone is opposite to the direction of the circular arc of the Ts isothermal line in reproduction, thereby causing a problem in that jitter tends to increase.

In order to solve the problem, the inventors found that annealing treatment of both sides of a recording track can change the herringbone shape of a conventional recording mark to a linear shape and is thus effective for decreasing jitter. However, the annealing step causes an increase in medium cost, causing a problem of mass-productivity of media.

SUMMARY OF THE INVENTION

The present invention has been achieved in consideration of the above problem, and an object of the present invention is to provide a magnetooptical recording medium suitable for domain wall motion reproduction.

In order to achieve the objects, in accordance with an embodiment of the present invention, a magnetooptical recording medium having domain wall displacement during reproduction comprises a substrate having lands and grooves, and a magnetic layer deposited on the substrate so as to be magnetically interrupted between the lands and grooves, wherein the magnetic film deposited on each of the lands has a section having a flat bottom, and a substantially flat top in the central portion of each of tracks, either side having a rounded upper corner and a thickness decreasing toward the side end.

In accordance with another embodiment of the present invention, a magnetooptical recording medium having domain wall displacement during reproduction comprises a substrate having projections provided between recording tracks, and a magnetic layer deposited on the substrate so as to be magnetically interrupted by the projections, wherein the magnetic layer deposited on each of the recording tracks has a section in which either side has a thickness decreasing toward the side end.

Further objects, features and advantages of the present invention will become apparent from the following description of the preferred embodiments with reference to the attached drawings.

DESCRIPTION OF THE PREFERRED EMBODIMENT

Embodiments of the present invention will be described with reference to the drawings.

Figure 7:
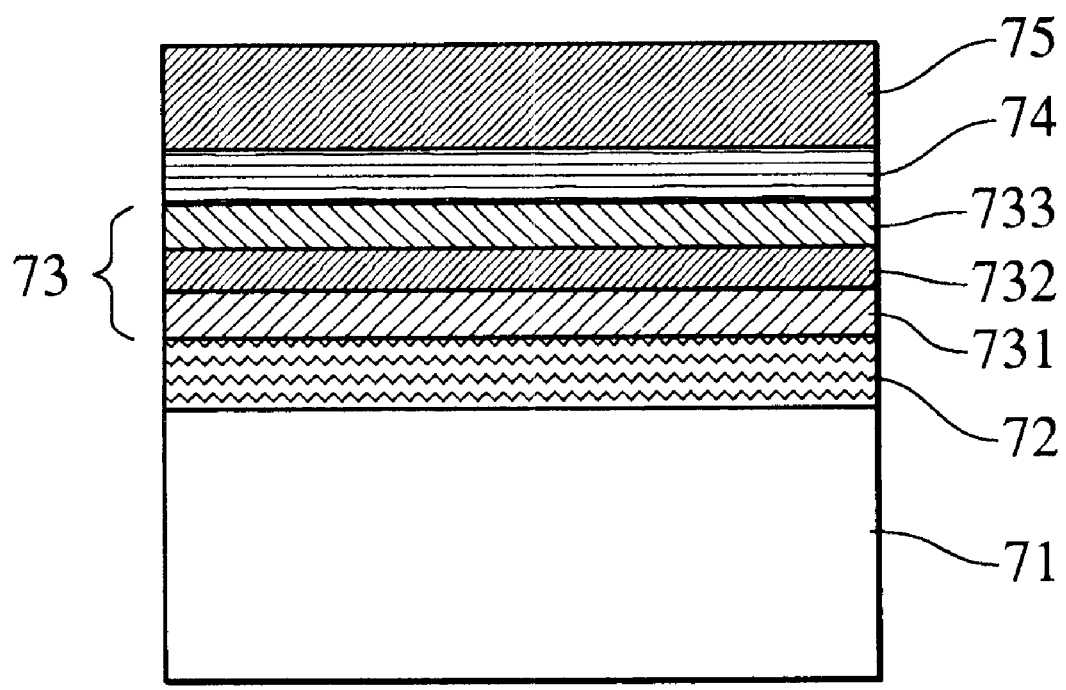
FIG. 7 is a schematic drawing showing the film structure of a magnetooptical recording medium in accordance with an embodiment of the present invention.

FIG. 7 is a schematic sectional view showing the film structure of a magnetooptical recording medium of the present invention. In FIG. 7, a first dielectric layer 72, a magnetic layer 73, a second dielectric layer 74 are laminated in turn on a transparent substrate 71.

For the transparent substrate 71, for example, glass, polycarbonate, polymethylmethacrylate, thermoplastic norbornene resin, and the like can be used.

The magnetic layer 73 may comprise a single layer or a lamination of a plurality of magnetic layers. Particularly, the present invention is suitable for a magnetooptical recording medium comprising a magnetic layer having the layer structure disclosed by the inventors in Japanese Patent Laid-Open No. 6-290493. Namely, as shown in FIG. 7, a first magnetic layer 731 is a magnetic layer (a layer causing domain wall displacement of a reproducing layer) which has relatively low domain wall coercive force and high domain wall mobility at near ambient temperature as compared with a third magnetic layer, a second magnetic layer 732 is a magnetic layer (switching layer) having a lower Curie temperature than the first and third magnetic layers, and the third magnetic layer 733 is a magnetic recording layer (memory layer) having excellent preservation stability of domains.

These magnetic layers are continuously deposited by a physical vapor deposition method such as sputtering, vacuum deposition, or the like so that exchange coupling or magnetostatic coupling is produced between the respective deposited magnetic layers.

Preferable examples of materials for the first magnetic layer 731 include rare earth-iron group amorphous alloys having relatively low magnetic anisotropy, such as a GdCo system, a GdFe system, a GdFeCo system, TbCo system, and the like; bubble memory materials such as garnet and the like.

An example of the second magnetic layer 732 is a Co- or Fe-type alloy magnetic layer which preferably has a lower Curie temperature than the first and third magnetic layers 731 and 733, and a lower value of saturation magnetization than the third magnetic layer 733. The Curie temperature can be adjusted by controlling the amount of Co, Cr, Ti, or the like added.

Preferable examples of materials for the third magnetic layer 733 include rare earth-iron group amorphous alloys such as TbFeCo, DyFeCo, TbDyFeCo, and the like; platinum group-iron group periodic structure films, which have high vertical magnetic anisotropy and which can stably maintain a magnetization state, such as Pt/Co, Pd/Co, and the like.

Although the first and second dielectric layers 72 and 74 are not limited, SiN, $SiO_2$, ZnS, and the like are preferably used. Furthermore, a protecting layer 75 comprising an ultraviolet resin or the like may be formed on the second dielectric layer 74 as needed.

Figure 3:
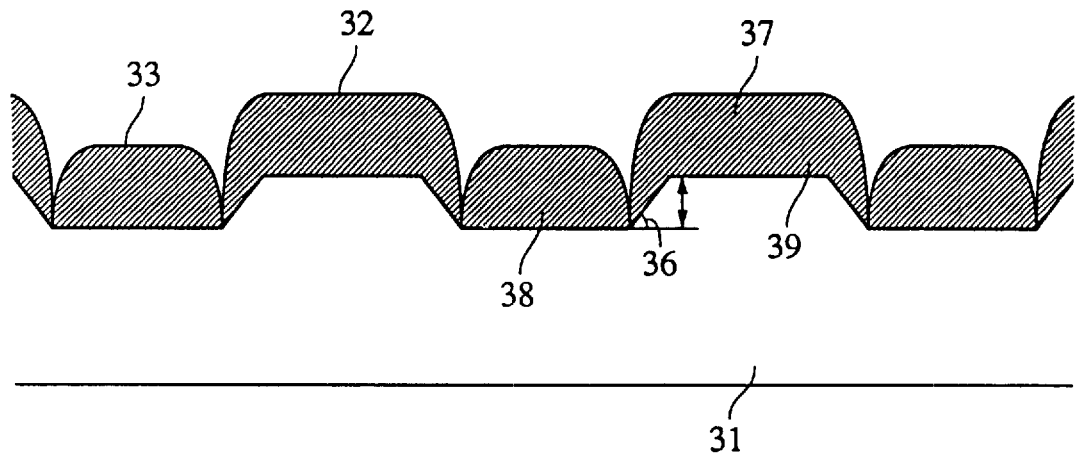
FIG. 3 is a sectional view of a conventional magnetooptical recording medium.

In the magnetooptical recording medium having lands serving as recording tracks, as described above, a Ts isothermal line has a circular-arc shape (herringbone) in each of the tracks, thereby causing an increase in jitter. This is caused by the fact that a recording film (a multilayered film including the magnetic layers) formed on each of the lands serving as the recording tracks has a mushroom-like sectional shape in the radial direction of the medium as shown in FIG. 3, i.e., the film has a substantially linear thickness distribution (equal thickness) in the direction of the track width. There is thus no difference in heat conduction between both sides and the central portion of the multilayered film formed on each of the lands, and the Ts isothermal line has a circular-arc shape, as viewed from the upper side of the medium. Namely, since a laser beam spot is a round spot having a radius of curvature, the medium has a temperature distribution in the track width direction in which the central portion has a higher temperature than each side. On the other hand, the equal-thickness portion has equal heat conductivity, as described above, and thus the isothermal line formed on the multilayered film has the same circular-arc shape as the Ts line.

Therefore, in order to produce a linear recording mark, the Ts isothermal line may be made linear. In order to make the Ts isothermal line linear, the heat conductivity may be controlled so that at each side of a track, the heat conductivity or film sensitivity is increased.

As a result of intensive research of the sectional structure of the multilayered film on each of the recording tracks on the lands in the transverse direction thereof, the inventors found that the following conditions are preferably satisfied.

1. The multilayered film in each recording track has a flat bottom, and a substantially flat top in the central portion of each of the recording tracks, either side having a rounded upper corner and a thickness gradually decreasing toward the side end.

2. The multilayered film is magnetically interrupted between the lands and grooves.

In consideration of the fact that the Ts isothermal line has a circular-arc shape, it is thought to be preferred that a continuous thickness gradient is provided in a region from the central portion to each side of each of the recording tracks. However, for the reasons below, it is rather advantageous that a thickness gradient is provided only on each side of each of the recording tracks.

1. Since the curvature of the circular-arc Ts isothermal line in the central portion of each of the tracks is higher than that on each side, it is sufficiently effective that a film thickness gradient is provided only on each side of each recording track.

2. Where the film thickness has a gradient over the entire portion from the central portion to each side of each recording track, much labor is required for milling to increase the cost, as compared with a case where the film thickness partially has a gradient.

Figure 2:
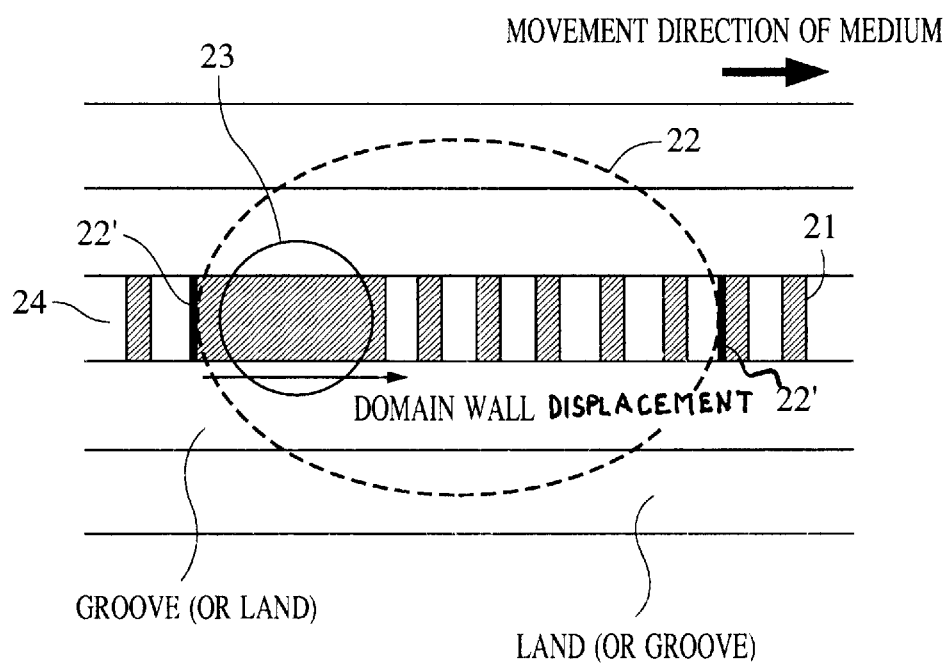
FIG. 2 is a schematic drawing showing the result of MFM observation of a spot formed by a laser beam for recording and reproduction, a Ts isothermal line, and recording domains from the upper side of a magnetooptical recording medium of the present invention.

FIG. 2 schematically shows the results of observation of a recording pit (mark) from the upper side of the magnetooptical recording medium (disk) of the present invention.

Figure 1:
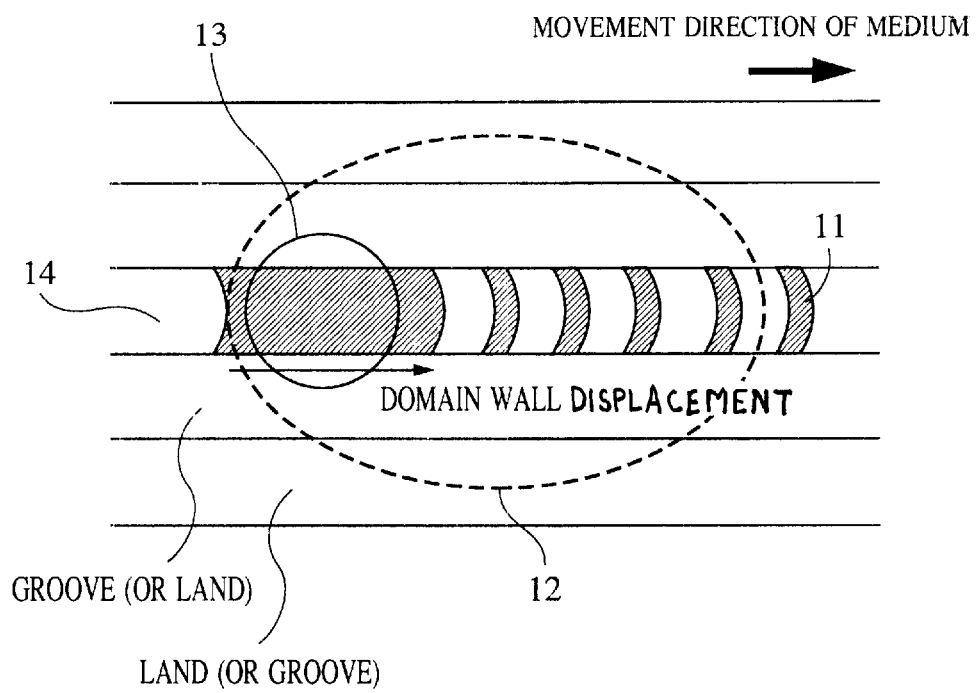
FIG. 1 is a schematic drawing showing the result of MFM (Magnetic Force Microscope) observation of a spot formed by a laser beam for recording and reproduction, a Ts isothermal line, and recording domains from the upper side of a conventional magnetooptical recording medium.

Like in FIG. 1, in FIG. 2, recording magnetic domains 21 are formed on each of recording tracks 24, and a Ts isothermal line 22 on the medium is extended elliptically in the movement direction of the medium. When the leading end of the Ts isothermal line 22 approaches each of the recording magnetic domains 21, domain wall motion occurs.

However, the magnetooptical recording medium comprises the multilayered film which is formed on each of the lands serving as the recording tracks and which has a structure (reference numeral 48 in FIG. 4) in which the film has a flat bottom, and a flat top in the central portion of each of the recording tracks, either side having a thickness gradually decreasing in the direction to the side end. In this structure, since heat conductivity increases as the film thickness decreases, the Ts isothermal line (reference numeral 22 in FIG. 2) formed by a recording spot of a laser beam is distorted to make a linear isothermal line (reference numeral 22' in FIG. 2) in each of the recording tracks, as viewed from the upper side of the medium. Therefore, the recording marks (the recording magnetic domains 21 shown in FIG. 2) are also linear, not a conventional herringbone shape.

As described above, in the magnetooptical recording medium of the present invention, the recording marks can be made linear, and at the same time, the Ts isothermal line of the reproduction spot is also linear in each of the tracks. Therefore, the curvature of the isothermal line in recording coincides with that in reproduction, decreasing jitter in reproduction. The linear Ts isothermal line means that the sensitivity of the recording film 73 varies in the radius direction of the tracks, as viewed from the medium side, i.e., each side has high sensitivity due to the influence of the small film thickness.

As described above, by using the conventional technique of devising the shape of a substrate and post-treatment after film deposition, the sectional structure of the multilayered film is controlled to impart a recording sensitivity distribution to the multilayered film, as described above. As a result, the Ts isothermal line can be made linear, and recording/reproduction performance is significantly improved.

As means for forming the multilayered film on the lands having the above-described sectional structure in which the multilayered film has a recording sensitivity distribution, a conventional injection molding method used for molding the substrate, a conventional etching method, or the like can be used. Therefore, the medium production cost can be significantly decreased, as compared with annealing.

Possible means for forming the multilayered film having the above-described sectional structure include the following:

1) Means for devising the shape of the substrate.

2) Means for cutting away unnecessary portions with etching after film deposition.

More specifically, the following means are possible.

Figure 5:
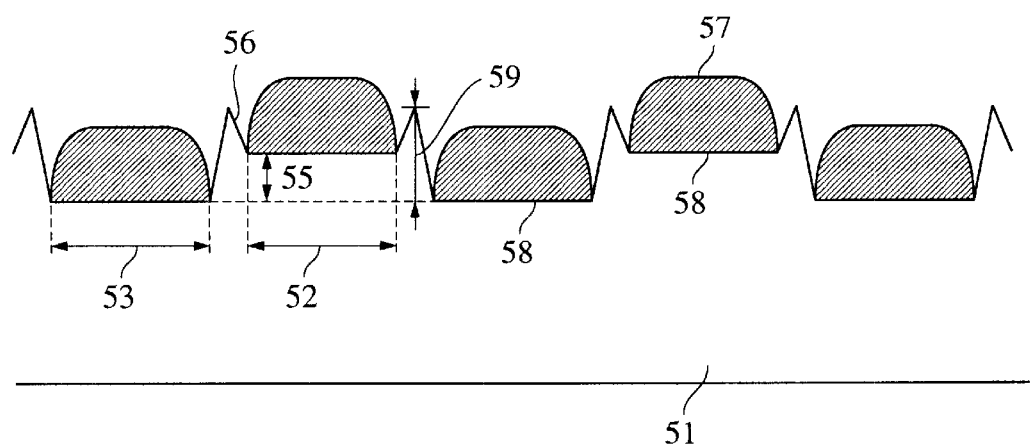
FIG. 5 is a sectional view of a magnetooptical recording medium in accordance with a second embodiment of the present invention.

1.1) A land-groove substrate having a shape comprising angulated taper portions is prepared so that the surfaces of both the lands and grooves are used as recording tracks (FIG. 5).

Figure 6:
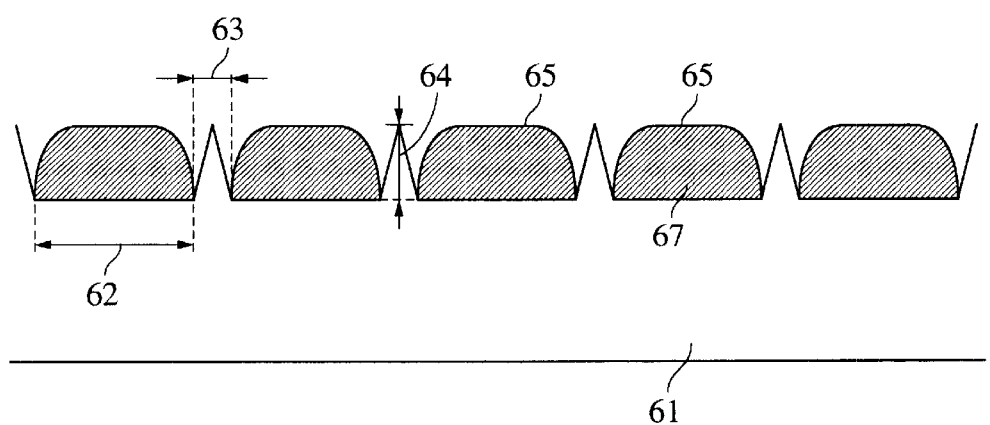
FIG. 6 is a sectional view of a magnetooptical recording medium in accordance with a third embodiment of the present invention.

1.2) A substrate having sharp projections between respective recording tracks is prepared so that both sides of the projections are used as recording tracks (FIG. 6).

Figure 4:
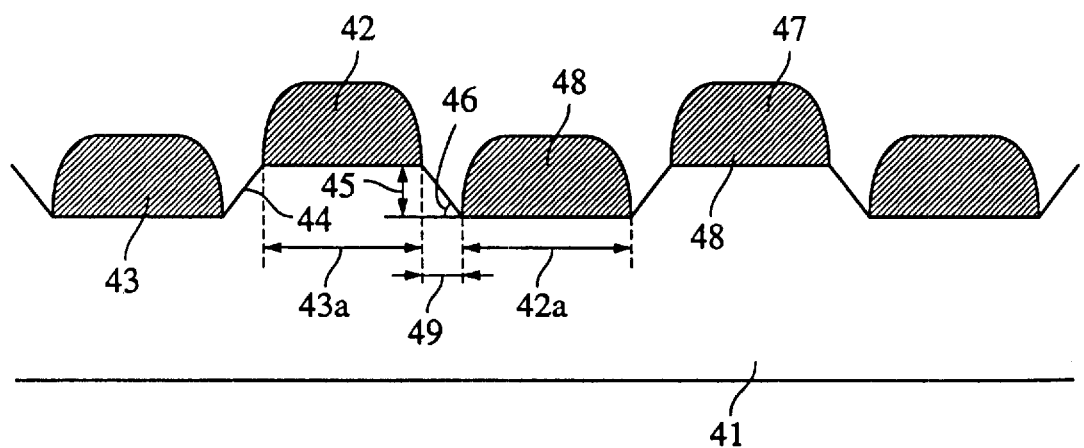
FIG. 4 is a sectional view of a magnetooptical recording medium in accordance with a first embodiment of the present invention.

2.1) After a film is deposited on a land-groove substrate, the film is removed from taper portions by milling with an iron beam. The lands or both the lands and grooves are used as recording tracks (FIG. 4).

The desired film (thickness distribution film or sensitivity distribution film) can be obtained by the above means.

In depositing the film on the land-groove substrate by sputtering, as shown in FIG. 3, the taper angle 36 of each inclined surface of the substrate is set to about 60 to 95° so as to employ the property that a film having the sectional shape shown by reference numeral 38 in FIG. 3 is deposited on each of the groove surfaces 33 due to the deposition effect of sputtered film when walls are present at both sides of each track. In this case, the multilayered film has a thickness distribution in which the thickness is maximum in the central portion of each track.

In the above means 1.1) and 1.2), taper surfaces (walls) having a large taper angle of about 60 to 95° are formed on both sides of the multilayered magnetic film on each of the tracks so that the film having the sectional shape shown in the drawings are formed due to the deposition effect of sputtered film. Besides these means, other means exhibiting the same effect can also be used.

In the above means 2.1), unnecessary portions are cut away by physical means in the post step to form the desired shape. The cutting means is not limited to ion beam cutting, and reverse sputtering, FIB (Focus Ion Beam), wet etching, or the like can be used.

Although the present invention will be described in further detail below with reference to embodiment, the present invention is not limited to these embodiments within the gist of the invention.

FIRST EMBODIMENT

A magnetooptical recording medium in accordance with an embodiment of the present invention is described with reference to FIGS. 4 (a schematic sectional view in the radius direction of a disk) and 7 (a schematic sectional view showing a layer structure).

In FIG. 4, a polycarbonate substrate 41 comprising a transparent substrate is a land-groove substrate having a land width 42a of 0.7 $\mu$m, a groove width 43a of 0.7 $\mu$m, a taper width 49 of 0.1 $\mu$m, a groove depth 45 of 160 nm, and a groove taper angle 46 of 70°. The layers of a multilayered film 47 are formed on the polycarbonate substrate 41 in the order below.

The multilayered film 47 is described with reference to FIG. 7. A SiN layer of 90 nm thick is formed as the first dielectric layer 72 (interference layer) on the transparent substrate 71, and a GdFeCr layer of 30 nm thick as the first magnetic layer (domain wall motion layer) 731, a TbFeCr layer of 10 nm thick as the second magnetic layer (switching layer) 732, and a TbFeCoCr layer of 80 nm thick as the third magnetic layer (memory layer) 733 are then formed in turn by sputtering. Finally, a SiN layer of 50 nm thick is formed as the second dielectric layer (protecting layer) 74 by sputtering to form the multilayered film 47.

These layers are deposited under sputtering conditions in which the SiN films are deposited by DC reactive sputtering with $N_2$ gas introduced in place of Ar gas, and the magnetic layers are deposited with the DC power applied to each of targets of Gd, Fe, Cr, Tb, and Co. In sputtering, the substrate is revolved while being rotated around its own axis.

Then, the film is removed from the inclined portions of the lands by milling with an ion beam. After processing, the sectional structure of the magnetooptical disk was observed on a microscope FE-SEM (Field Emission Scanning Electron Microscope). Observation was carried out with an acceleration voltage of 10 kV, and a magnification of ×40000. FIG. 4 shows the results of the observation. In FIG. 4, the multilayered film 47 is substantially removed from the taper portions 44 to leave the multilayered film 47 on the lands 42, which has the same section 48 as the grooves 43. Namely, it was observed that on both the lands and grooves, the multilayered film has a thickness distribution in which the thickness is maximum in the central portion of each track.

Then, an ultraviolet curing resin is coated to 10 $\mu$m to form the protecting layer 75.

The thus-obtained magnetooptical disk was set in a general-purpose optical disk evaluating apparatus to record repeat signals having a mark length of 0.15 $\mu$m on the lands at a linear speed of 1.5 m/sec by a conventional magnetic field modulation system.

At this time, no data was recorded on the adjacent groove surfaces on both sides. The grooves surfaces were not annealed. The thus-obtained recording tracks were subjected to reproduction by using "Domain Wall Motion Type Enlarged Reproduction Method using Temperature Gradient of Magnetic Layer" (refer to Japanese Patent Laid-Open No. 6-290496). As a result, in a NA-0.6 optical system having a wavelength of 680 nm and a relative speed of 1.5 m/sec, C/N of 39.5 dB and jitter 7.9 nsec were obtained with high reproducibility. The error rate was a level with no practical problem. After this reproduction experiment, recording was also performed on the groove surfaces.

For the grooves, the same recording and reproduction performance as the above was measured to produce the same results as the lands. Namely, in the medium of the present invention, land-groove recording on a domain wall displacement-type magnetooptical recording medium was achieved.

Next, in the disk of the present invention, the protecting film 75 was removed, and the magnetic domains recorded on the lands were observed on a microscope MFM (Magnetic Force Microscope). As a result, as shown in a schematic drawing of FIG. 2, the magnetic domains 21 were linearly formed (rectangular shape), as viewed from the upper side of the medium. The magnetic domains formed on the grooves were also linear (rectangular) in the radius direction, as shown in a schematic drawing of FIG. 2.

COMPARATIVE EXAMPLE 1

The same process as the first embodiment was repeated except that the multilayered film on the lands was not subjected to milling.

The thus-obtained magnetooptical disk was set in a general-purpose optical disk evaluating apparatus to record repeat signals having a mark length of 0.15 $\mu$m on the lands at a linear speed of 1.5 m/sec by a conventional magnetic field modulation system. At this time, no data was recorded on the adjacent groove surfaces on both sides. The grooves surfaces were not annealed.

The thus-obtained recording tracks were subjected to reproduction by using the domain wall motion-type enlarged reproduction method. As a result, in a NA-0.6 optical system having a wavelength of 680 nm and a relative speed of 1.5 m/sec, C/N of 37.5 dB and jitter 10.2 nsec were obtained. The error rate deteriorated about 40 times to cause a practical problem, as compared with the first embodiment.

Next, in the disk of this comparative example, the protecting film 75 was removed, and the shape of magnetic domains was observed by using MFM. As a result, as shown in a schematic drawing of FIG. 1, the magnetic domains 11 were formed in a herringbone shape, as viewed from the upper side of the medium. In FE-SEM microscope observation (magnification of about ×40000) of the sectional structure of the multilayered film of the disk of this comparative example, the multilayered film 37 on the lands had a mushroom shape 39 (the shape of the multilayered film on the lands shown in FIG. 3) in which the multilayered film 37 is formed on the taper portions.

These results indicate that with the film having a mushroom-like sectional shape, the isothermal line 12 on the surface of the medium is elliptical, and consequently, the recorded magnetic domains 11 have a herringbone shape, thereby causing no improvement in reproduction performance. Both sides of the herringbone magnetic domains 11 correspond to the taper portions of the land-groove substrate shown in FIG. 3. However, the taper portions generally have high surface roughness, and are thus thought to cause difficulties in domain wall displacement. It is also thought that a difference (opposed herringbone directions) between the isothermal lines in recording and reproduction causes an increase in jitter.

SECOND EMBODIMENT

A magnetooptical disk is prepared by using a substrate having such a sectional shape as shown In FIG. 5. The substrate has angulated taper portions (serving as guard bands), and the land in each of the tracks has walls at both sides thereof like the grooves. The substrate 51 has a land width 52 of 0.7 $\mu$m, a groove width 53 of 0.7 $\mu$m, a groove depth 55 of 160 nm, and an angle height of the guard bands 56 of 300 nm. In order to function as a shielding surface during deposition, the angle height may be about $\frac{2}{3}$ or more of the thickness of multilayered film 57. The taper angle is preferably 60 to 85°, and the angle width is preferably as small as possible in order to narrow the track pitch accompanying an increase in the track density. However, from the viewpoint of limitation of the forming technique, the angle width is preferably ½ to ⅓ of the land width 52 or the groove width 53.

The substrate is produced by conventional injection molding, and the angular portions are formed by using a resist material having higher exposure sensitivity than a general value. The steps between the lands and the grooves are formed by using two beams having different powers.

After the same multilayered film as the first embodiment was formed on the substrate, the sectional structure was observed on a microscope FE-SEM. The results are shown by a shape 58 in FIG. 5. Namely, it was observed that the multilayered film has a thickness distribution in which in both the lands and grooves, the thickness is maximum in the central portion of each track.

The thus-obtained magnetooptical disk was set in a general-purpose optical disk evaluating apparatus to record repeat signals having a mark length of 0.15 $\mu$m on the lands at a linear rate of 1.5 m/sec by a conventional magnetic field modulation system.

At this time, no data was recorded on the adjacent groove surfaces on both sides. The grooves surfaces were not annealed. The thus-obtained recording tracks were subjected to reproduction by using the domain wall motion-type enlarged reproduction method in the same manner as the first embodiment. As a result, in a NA-0.6 optical system having a wavelength of 680 nm and a relative speed of 1.5 m/sec, C/N of 40.0 dB and jitter 7.2 nsec were obtained with high reproducibility. The error rate was at a level with no practical problem. After the reproduction experiment, recording was also performed on the groove surfaces.

For the grooves, measurement of the same recording and reproduction performance as the above produced substantially the same results as those shown in FIG. 1. Namely, in the medium of the present invention, land-groove recording on a domain wall displacement-type magnetooptical recording medium was achieved.

Next, in the disk of this embodiment, the protecting film 75 was removed, and the magnetic domains recorded on the lands were observed on a microscope MFM (Magnetic Force Microscope). As a result, as shown in a schematic drawing of FIG. 2, the magnetic domains 21 were linearly formed (rectangular shape), as viewed from the upper side of the medium. Like in the first embodiment, the magnetic domains formed on the grooves were also linear (rectangular), as shown in a schematic drawing of FIG. 2.

These results indicate that the effect of the present invention can be obtained by devising the substrate shape, and forming the film (dielectric layer/magnetic layer/dielectric layer) so that the film has a sectional structure having the shape 58 shown in FIG. 5.

THIRD EMBODIMENT

A magnetooptical disk is prepared by using a substrate having such a sectional shape as shown in FIG. 6. The substrate has angulated guard bands and recording tracks. Each of the recording tracks has walls on both sides thereof. The substrate 61 has a track width 62 of 0.7 μm, a guard band width 63 of 0.25 μm, and a angle height 64 of the guard bands of 200 nm. In order to function as a shielding surface during deposition, the angle height may be about ⅔ or more of the thickness of the multilayered film 67. The taper angle is preferably 60 to 85°, and like in the first embodiment, the angle width is preferably ½ to ⅕ of the track width 62.

Like in the first embodiment, the substrate is produced by conventional injection molding.

After the same multilayered film as the first embodiment was formed on the substrate, the sectional structure was observed on a microscope FE-SEM. As shown in a schematic drawing of FIG. 6, each of the recording tracks has a shape 65. Namely, it was observed that the multilayered film has a thickness distribution in which the thickness is maximum in the central portion of each track.

The thus-obtained magnetooptical disk was set in a general-purpose optical disk evaluating apparatus to record repeat signals having a mark length of 0.15 μm on the recording track surfaces at a linear speed of 1.5 m/sec by a conventional magnetic field modulation system. At this time, the groove surfaces were not annealed. The thus-obtained recording tracks were subjected to reproduction by using the domain wall displacement-type enlarged reproduction method in the same manner as the first embodiment. As a result, in a NA-0.6 optical system having a wavelength of 680 nm and a relative speed of 1.5 m/sec, C/N of 40.3 dB and jitter 7.0 nsec were obtained with high reproducibility. The error rate was a level with no practical problems.

Next, in the disk of this embodiment, the protecting film 75 was removed, and the magnetic domains recorded on the recording tracks were observed on a microscope MFM. As a result, as shown in a schematic drawing of FIG. 2, the magnetic domains 21 were linearly formed (rectangular shape), as viewed from the upper side of the medium.

These results indicate that like in the second embodiment, the effect of the present invention can be obtained by devising the substrate shape, and forming the film (dielectric layer/magnetic layer/dielectric layer) so that the film has a sectional structure having the shape 65 shown in FIG. 6.

As described above, the magnetooptical recording medium of the present invention comprises a multilayered film formed on the lands and having a sectional structure (a sectional structure in the radius direction) in which the film has a flat bottom, and a flat top in the central portion of each recording track, either side having a thickness decreasing in the direction to the side end. Alternatively, the magnetooptical recording medium comprises a substrate on which no land is formed so that grooves are closed up in the radial direction, as in the third embodiment. As a result, the Ts isothermal lines in recording and reproduction are linear, and jitter in reproduction is significantly improved.

Particularly, in the magnetooptical recording medium (domain wall displacement-type magnetooptical recording medium using the temperature gradient of magnetic layers) disclosed in Japanese Patent Laid-Open No. 6-290496, the present invention is effective for significantly improving the recording density.

The magnetooptical recording medium of the present invention can be obtained by a very simple method comprising forming the substrate in the predetermined shape by injection molding, depositing a film, and then cutting away the film from taper portions, thereby exhibiting excellent mass-productivity.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A domain wall displacement magnetooptical recording medium comprising:
   a substrate having lands and grooves and a sloped portion between each of the lands and grooves; and
   a magnetic layer deposited on the substrate, wherein the magnetic layer is not deposited on the sloped portions, and the magnetic layer formed on each of the lands has a sectional shape having a flat bottom, and a substantially flat top in the central portion of each of the lands, either side having a rounded upper corner and a thickness decreasing in the direction to the side end.

2. A magnetooptical recording medium according to claim 1, wherein the magnetic layer comprises first, second and third magnetic layers, the first magnetic layer comprising a magnetic layer having relatively lower domain wall coercive force, and higher domain wall mobility than the third magnetic layer at near ambient temperature, the second magnetic layer comprising a magnetic layer having a lower Curie temperature than the first and third magnetic layers, and the third magnetic layer comprising a perpendicular layer.

3. A magnetooptical recording medium according to claim 1, wherein the magnetic layer has a sensitivity distribution which increases from the central portion of each of the lands to both sides thereof.

* * * * *